No. 714,154. Patented Nov. 25, 1902.
A. G. DAVIS.
SYSTEM OF ELECTRICAL DISTRIBUTION.
(Application filed June 25, 1897.)
(No Model.) 2 Sheets—Sheet 2.
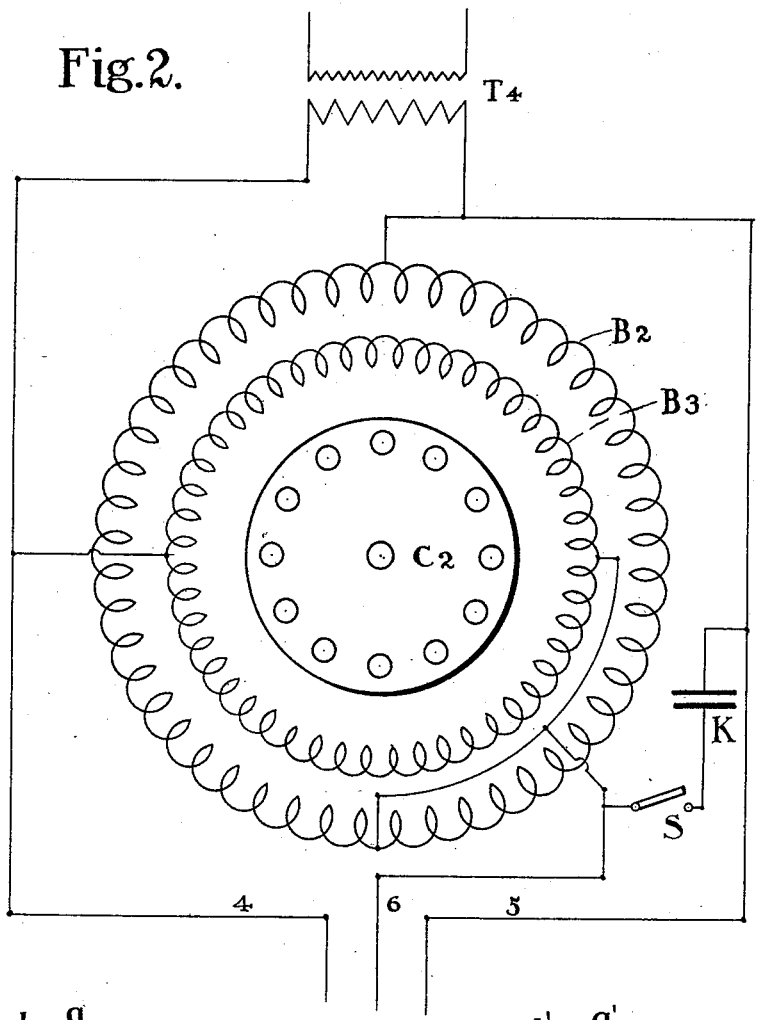
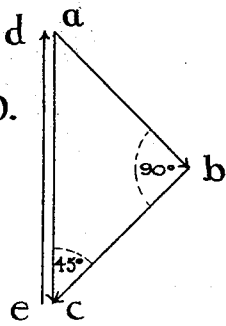
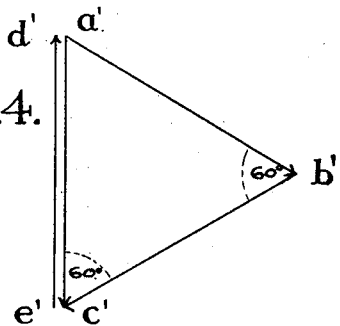
Witnesses
Inventor
Albert Gould Davis

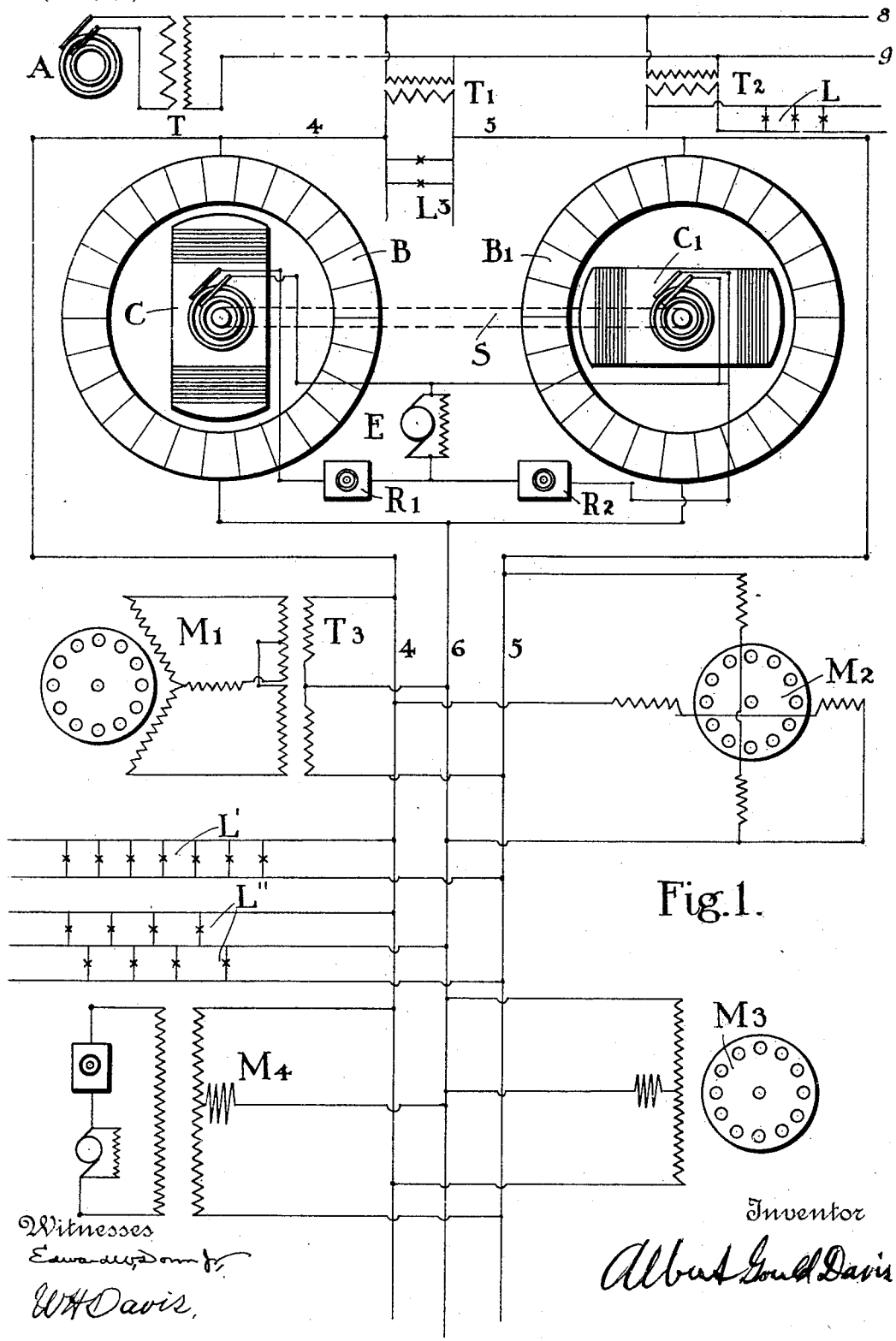

UNITED STATES PATENT OFFICE.

ALBERT GOULD DAVIS, OF WASHINGTON, DISTRICT OF COLUMBIA, ASSIGNOR TO THE GENERAL ELECTRIC COMPANY, A CORPORATION OF NEW YORK.

SYSTEM OF ELECTRICAL DISTRIBUTION.

SPECIFICATION forming part of Letters Patent No. 714,154, dated November 25, 1902.

Application filed June 25, 1897. Serial No. 642,239. (No model.)

*To all whom it may concern:*

Be it known that I, ALBERT GOULD DAVIS, a citizen of the United States, residing at Washington, in the District of Columbia, have invented certain new and useful Improvements in Systems of Electrical Distribution, (Case No. 8,) of which the following is a specification.

My invention relates to systems of electrical distribution, and more particularly to those systems in which it is desired to supply multiphase translating devices from single-phase mains, though it is applicable to any system in which it is desired to increase the number of phases of an alternating current.

In practicing my invention I provide a plurality of sources of electromotive force, preferably, though not necessarily, counter electromotive force, dephased from each other by a definite and fixed amount, and I prefer to connect these sources in series across each pair of the mains carrying the current whose number of phases is to be increased. The electromotive forces of these sources being dephased from each other form with the electromotive force on the mains a system of polyphase electromotive forces of an order depending on the number of phases of electromotive force of the sources and on the order of the original system. For example, it is possible to join two armatures mechanically or otherwise so that their electromotive forces are dephased by ninety degrees and to connect them in series across a pair of single-phase mains. With this arrangement a two-phase system of currents and electromotive forces may be obtained. In a similar manner it is possible to obtain a three-phase system.

In the annexed drawings, which illustrate embodiments of my invention, Figure 1 is a general view of a single-phase system of distribution with means for supplying two-phase currents to a translating device connected thereto. Fig. 2 is a view of a modification, and Figs. 3 and 4 are vector diagrams.

Referring more particularly to Fig. 1, A represents a single-phase generator feeding a pair of mains 8 9 through the step-up transformer T. Connected to these mains are other transformers, as T' T². At those portions of the system where single-phase translating devices only are desired these transformers are connected to a pair of secondary mains in the usual way. Such an arrangement is illustrated at T², where lamps L are shown in multiple with the secondary mains; but at points where multiphase currents are desired, as at T', my improved phase-modifier is inserted. It will be seen that the mains 4 and 5, leading from the secondary winding of T', are connected to the primary windings B B' of a pair of synchronous dynamo-electric machines connected in series across the lines. These machines are preferably motors, but may, if preferred, receive external power. The secondary members C C' of these machines, which in the form shown are the direct-current members, are rigidly coupled together, as by the shaft S, in such a way that the electromotive forces or counter electromotive forces of the two machines are dephased. While I have illustrated a rigid mechanical connection, I do not limit myself thereto, but contemplate using any mechanical or electrical or other means which will secure the desired result; but I do not desire to include in this specification or in the claims hereto annexed any device in which the mutual reactions between three alternating dynamo-electric machines connected in series are the only means of securing the desired phase difference, as I am not the inventor thereof. The members C C' are shown as excited from the direct-currect exciter E, and their excitation is controlled by the adjustable resistances R' R², as usual.

In the specific form illustrated the phase angle between the electromotive forces of the two motors is ninety degrees. Let the vector $e\,d$, Fig. 3, represent in magnitude and phase the impressed electromotive force at the secondary terminals of T'. Let $a\,b$ and $b\,c$, two vectors such that the angle $a\,b\,c$ is ninety degrees, represent the electromotive force of the two auxiliary machines. Then if the two field-magnets C C' are properly adjusted the vectors $a\,b$ and $b\,c$ will form with their resultant $a\,c$ an isosceles right triangle, and the resultant may be made equal in magnitude to the impressed electromotive force $e\,d$ and opposite in phase. Therefore the electromotive forces $a\,b$, $b\,c$, and $d\,e$ are such that two-phase currents flow in the system 4 5 6, connected to the outer terminals and to the point intermediate the windings.

I have shown various translating devices connected with the mains, as motors M' M² M³ M⁴.

M' is a three-phase motor fed through the phasing-transformer T³. This phasing-transformer is of the well-known Scott type and need not be particularly described herein. M² is a two-phase induction-motor of any preferred type. M³ is a monocyclic induction-motor so wound as to take current from the main 6 only when starting, as is well understood in the art. A synchronous motor may be used, if preferred, and I have shown a monocyclic synchronous motor at M⁴ provided with a separate exciter and rheostat.

High-voltage lamps L' may be connected across the mains 4 5, while low-voltage lamps L'' may be inserted, as is usual, in two-phase systems. I have also shown lamps L³ connected direct to the secondary terminals of the transformer T', where they will not tend to unbalance the system.

As indicated in Fig. 4, the angle between the two auxiliary sources of electromotive force may be made one hundred and twenty degrees, when a three-phase system will be formed, the vectors being $a'\,b'$, $b'\,c'$, and $d'\,e'$.

It is obvious that by suitably choosing the number and phase angles of the auxiliary sources of electromotive force any preferred system may be obtained.

I have shown my improved phase-modifier applied to a single-phase system; but it is obvious that it may be applied to any system whatever. Each phase-modifier so applied will serve to increase the number of phases of electromotive force between the two terminals across which it is connected.

I have illustrated in Fig. 2 another form which my improved phase-modifier may take. T⁴ is a source of electromotive force and may be a transformer connected to a single-phase system at any desired point. B² B³ are two angularly-displaced primary windings, preferably on a single core, connected in series, as shown. C² is the secondary member, which may be of any suitable type—as, for example, similar to C or C', Fig. 1. I have, however, shown it as a short-circuited rotor. When once started, this device will run as a single-phase induction-motor; but the counter electromotive forces of the two windings B² and B³ are dephased, as one winding is in advance of the resultant polar line, while one is behind it. The dephased counter electromotive forces act as do the electromotive forces or counter electromotive forces of B and B', Fig. 1, and the wires 4 5 6, connected to the outer and intermediate terminals of the two windings, form a multiphase system, the phase angles of which depend on the angles between the connection B² and B³.

In order to start the armature C², I have illustrated a condenser K with a suitable switch S in multiple with one of the inducing-windings, as B². When the switch S is closed, this condenser tends to advance the current in B³, with which it is in series, and to lag the current in B², with which it is in shunt, and a rotary field is created which causes the armature to start. When a proper speed is attained, the switch S is opened and the machine runs as an induction-motor, as before stated, supplying multiphase currents to the mains 4 5 6.

I do not claim in this application the novel method herein disclosed, since this method constitutes the subject-matter of a divisional application, Serial No. 103,151, filed April 16, 1902. Neither do I restrict myself to the various forms shown and described herein, since it is obvious that they may be greatly varied without departing from the spirit and scope of my invention.

What I claim as new, and desire to secure by Letters Patent of the United States, is—

1. In combination, a source of single-phase electromotive force, a plurality of primary windings connected in series with each other and with said source, said windings being so mounted that they are rigidly maintained in fixed angular relation to one another, a secondary member capable of rotation relatively to said windings, and connections leading from said windings to translating devices.

2. In combination, a source of single-phase electromotive force, a plurality of primary windings connected in series with each other and with said source, said windings being so mounted that they are rigidly maintained in fixed angular relation to one another, a secondary member capable of rotation relatively to said windings, and connections leading from the terminal and intermediate points of said windings, to a system of distribution.

3. The combination of a source of single-phase electromotive force, a plurality of primary windings connected in series with each other and with said source, the different primary windings being so mounted and arranged that their counter electromotive forces are rigidly maintained in a dephased relation, a short-circuited member capable of rotation relatively to said windings, and connections leading from said windings to translating devices.

4. In combination, a source of single-phase electromotive force, a plurality of angularly-displaced primary windings connected in series with each other and with said source, a secondary member capable of rotation relatively to said windings, means for starting said secondary member, and connections leading from said windings to translating devices.

5. The combination of a source of single-phase electromotive force, a plurality of primary windings connected in series with each other and with said source, the different primary windings being so mounted and arranged that their counter electromotive forces are rigidly maintained in a dephased relation, a short-circuited secondary member capable of rotation relatively to said windings, means for starting said secondary member, and connections leading from said windings to translating devices.

6. In combination, a source of electromotive force, a plurality of windings connected thereto, means for producing in said windings electromotive forces of displaced phase, means for maintaining a fixed and definite phase relation between said electromotive forces, and connections from said windings to translating devices.

7. The combination of a source of electromotive force, as for example a secondary coil of a transformer, a plurality of windings connected thereto and constituting sources of electromotive forces, means for maintaining a fixed and definite phase relation between the electromotive forces of said sources, and means whereby the resultant electromotive forces of the said windings shall be maintained in a definite phase relation with said source, substantially as described.

8. The combination with a source of single-phase current, of a plurality of windings, on one or more dynamo-electric machines, connected in series across the said source, means for producing in said windings electromotive forces of displaced phase, and mechanical connections establishing a fixed and definite phase relation between the electromotive forces of the said windings, but leaving the resultant of said electromotive forces free to arrange itself in the proper phasal relation with the said source.

9. The combination with a source of single-phase current, of a plurality of windings, upon one or more dynamo-electric machines, connected in series across the said source, means for producing in said windings electromotive forces of displaced phase, and mechanical connections establishing a fixed and definite phase relation between the electromotive forces of said windings, but leaving the resultant of said electromotive forces free to arrange itself in the proper phasal relation with the said sources, and connections from terminal and intermediate points of said windings to a multiphase translating device.

10. In combination, a source of single-phase electomotive force, a plurality of primary windings connected in series across the source, said windings being so mounted that they are rigidly maintained in fixed angular relation to one another, means for generating electomotive forces of displaced phase in said windings, and connections leading therefrom to translating devices.

11. In combination, a source of single-phase electromotive force, a plurality of primary windings connected in series across the source, said windings being so mounted that they are rigidly maintained in fixed angular relation to one another, means for generating electromotive forces of displaced phase in said windings, and a system of distribution having its conductors connected to the terminal and intermediate points of said windings.

12. In combination, a source of single-phase electromotive force, a plurality of primary windings connected in series across the source, means for generating electromotive forces of displaced phase in said windings, the said windings being so mounted that the electromotive forces generated therein are rigidly maintained in a definite phase relation, and connections leading therefrom to translating devices.

13. In combination, a source of single-phase electromotive force, a plurality of primary windings connected in series across the source, means for generating electromotive forces of displaced phase in said windings, the said windings being so mounted that the electromotive forces generated therein are rigidly maintained in a definite phase relation, and a system of distribution having its conductors connected to the terminal and intermediate points of said windings.

Signed at Washington, District of Columbia, this 17th day of June, A. D. 1897.

ALBERT GOULD DAVIS.

Witnesses:
W. H. DAVIS,
THEO. T. SNELL.